United States Patent [19]

Weiner et al.

[11] Patent Number: 4,541,190
[45] Date of Patent: Sep. 17, 1985

[54] MULTIFACED, FOLDABLE TRAFFIC DISPLAY

[75] Inventors: Andrew Weiner, New Brunswick; Harold M. Hodgkins, East Brunswick, both of N.J.

[73] Assignee: Harold M. Hodgkins, New Brunswick, N.J.

[21] Appl. No.: 573,714

[22] Filed: Jan. 25, 1984

[51] Int. Cl.$^4$ ............................................. G09F 15/00
[52] U.S. Cl. .................................. 40/610; 40/124.1; 40/10 R; 40/530
[58] Field of Search ............. 40/584, 610, 530, 124.1, 40/152.1, 154

[56] References Cited

U.S. PATENT DOCUMENTS

| | | | |
|---|---|---|---|
| 3,322,093 | 5/1967 | Goland et al. | 40/610 |
| 4,182,063 | 1/1980 | Klosel | 40/610 |
| 4,270,291 | 6/1981 | Barbberi | 40/530 |
| 4,462,145 | 7/1984 | Schulze | 40/610 |

FOREIGN PATENT DOCUMENTS

| | | | |
|---|---|---|---|
| 1037383 | 9/1953 | France | 40/610 |
| 2086116 | 5/1982 | United Kingdom | 40/610 |

Primary Examiner—Gene Mancene
Assistant Examiner—Wenceslao J. Contreras
Attorney, Agent, or Firm—Richard C. Woodbridge

[57] ABSTRACT

A foldable, collapsible traffic display is storable in the flat, folded state and can be erected to form a three dimensional hollow triangle or box. The apparatus includes three rectangular panels connected together by two folding hinge portions and a holding means for locking the display in its erected state. According to one embodiment, the display includes a balast pocket in the central panel and a Velcro ®-like holding means. An alternative embodiment employs tabs having a special geometry and male and female snap fasteners to lock the display in position. Warning indicia are printed on the panels and the erected display is preferably oriented during use so that the appropriate warning is visible to oncoming traffic. The display may be turned inside-out and locked in the reverse mode so that the warning indicia on all six panels can be made visible to other motorists.

9 Claims, 12 Drawing Figures

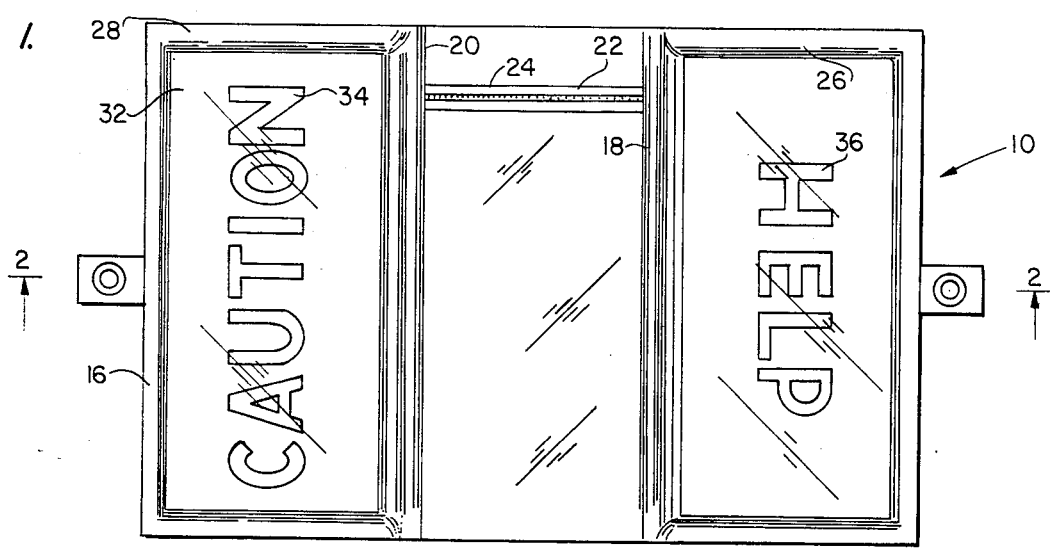
Fig. 1.
Fig. 2.
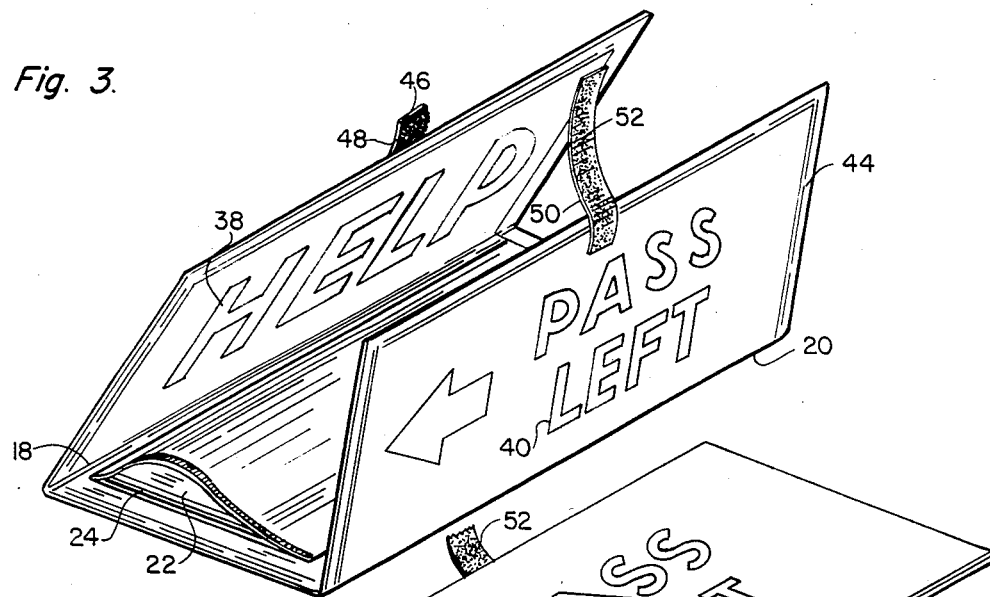
Fig. 3.
Fig. 4.
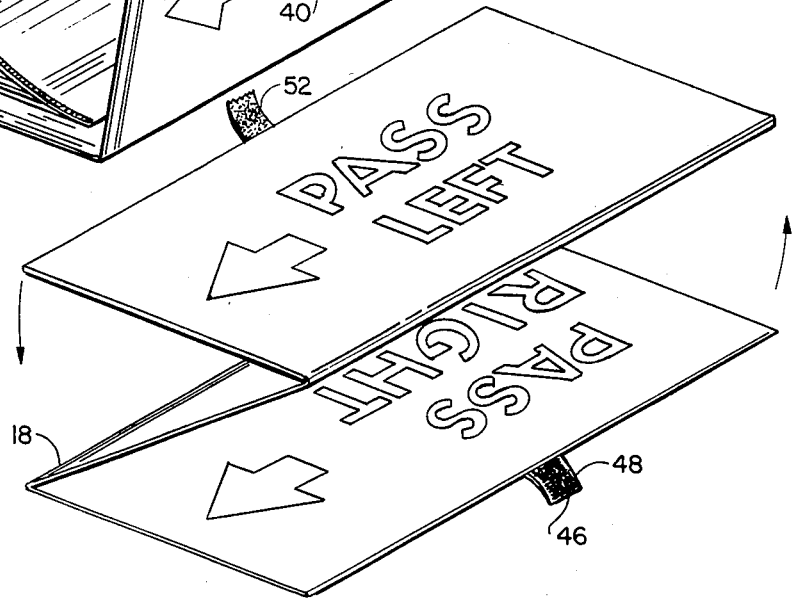

MULTIFACED, FOLDABLE TRAFFIC DISPLAY

BACKGROUND OF THE INVENTION

1. Field of the Invention

The present invention relates to a collapsible apparatus that can be erected to form a hollow, three dimensional traffic display.

2. Description of the Prior Art

There are numerous devices known to those of ordinary skill in the art for signaling warnings to oncoming traffic. For example, stranded motorists frequently tie a hankerchief to the radio antenna of a disabled automobile to call for help. Traffic control officers at the scene of fires or accidents often use hand-held signs to warn other vehicles of danger. It is also common for motorists to write their message on a piece of cardboard so that passing traffic knows the nature of the distress. Unfortunately, most known prior art devices are either too bulky for the average motorist to keep in the trunk of the car or they require a large piece of material that can be written on. In view of the foregoing, it appeared that a traffic warning display device was needed that could be conveniently stored in a flat, folded state and erected to form a three dimensional triangle or box. Such a device would be especially useful if it could display a plurality of different messages and if it could be oriented so that individual messages can be selectively displayed. Finally, such a device would have to be geometrically balanced or at least provide a place where ballast material can be placed.

SUMMARY OF THE INVENTION

Briefly described, the invention comprises a flat, three panel apparatus that can be folded to form a three dimensional traffic display device. The three panels are attached along two flexible folding hinge lines. Each face of the display can carry a warning indicia such as "HELP", "STOP", "NEED GAS", etc. According to one embodiment, a pocket is provided in one panel to receive ballast material to keep the display from blowing away. Velcro ®-like straps are used to lock the display into a triangular shape. The panels include plastic envelopes that can receive removable cards with different warning indicia thereon. Therefore, the warning indicia can be changed as the traffic conditions may require. According to an alternative embodiment, a pair of side tabs are provided on two of the three foldable panels. Male and female snap fasteners are attached to the side tabs and located in such a manner that they mate with each other when the device is folded into three three dimensional mode. The alternative embodiment of the invention is capable of forming either a three dimensional, hollow triangle or box. The end panels may be rotated 180 degrees and reattached so as to turn the display inside out and present a new set of faces to the oncoming traffic. These and other aspects of the present invention will be understood by referring to the following drawings.

BRIEF DESCRIPTION OF THE DRAWINGS

FIG. 1 is a plan view of the preferred embodiment of the display shown in the unfolded state.

FIG. 2 is a cross-sectional view of the embodiment of FIG. 1 taken along line 2—2.

FIG. 3 is a perspective view of the display of FIG. 1 showing the apparatus in a first unfolded state in which each panel portion forms the side of a hollow prismoid.

FIG. 4 is a perspective view of the embodiment of FIG. 1 showing the display device in a second folded configuration suitable for storage.

DETAILED DESCRIPTION OF THE PREFERRED EMBODIMENT

Figure 5:
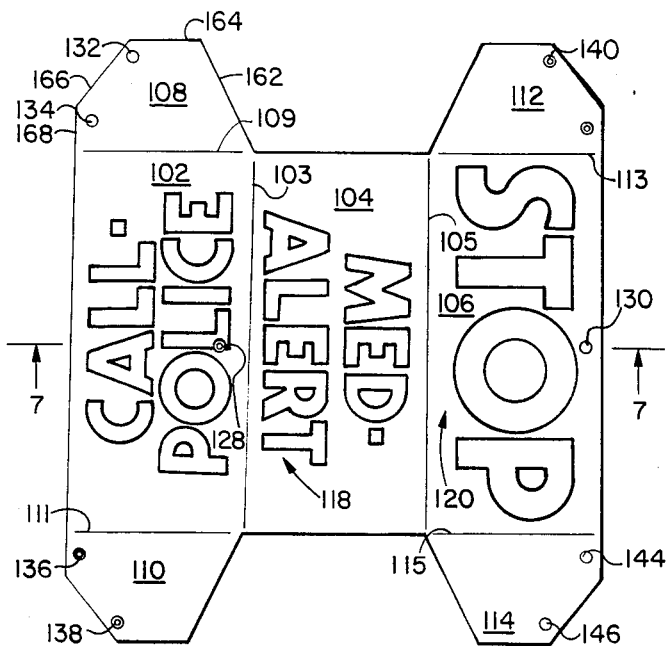
FIG. 5 illustrates an alternative embodiment of the invention in which the display is shown in the unfolded state with a first side up.

During the course of this description like numbers will be used to identify like elements according to the different views which illustrate the invention.

A preferred embodiment of the foldable traffic display invention comprises a single, substantially rectangular sheet 10, which may be a laminate of two or more layers 12 and 14. When comprised of a plurality of such layers or laminates, the same can be joined about all or a portion of the outer perimeter as at weld 16. The sheet will have at least two fold lines 18 and 20 defined thereon. Each of the fold lines is parallel to two parallel edges of said sheet, thereby dividing the sheet into at least three panel portions. Conveniently the fold lines can be defined by a weld, optionally formed simultaneously with the formation of weld 16. There may be more than two fold lines, as for example, three or four, (thereby producing a correspondingly larger prismoid shape).

A pocket 22 operable to receive ballast is defined in one of said panel portions. Preferably, but not necessarily, this pocket is defined in the centermost panel portion of the sheet. Conveniently pocket 22 can be defined between laminates 12 and 14 by effecting a weld at fold lines 18 and 20 and the outer weld 16. A plastic "zipper" 24 can also be provided in order to make the pocket closable. Pocket 22 is operable to receive any convenient ballast material such as sand, soil, a rock, a trunk tool, or the like, so as to stabilize the device against wind and the air flow of passing cars, which ballast, however, can be easily removed when one wishes to stow the device after use.

Means operable to display warning indicia are associated with at least one of the remaining panels portions. In the embodiment shown in FIG. 1, at least one laminate is transparent and welds 16 and fold line 18 and 20 of each outer panel portion define an envelope (the fourth side 26 and 28, respectively being unsealed so as to provide an opening) for receipt of a card 30 and 32 bearing any desired warning indicia 34 and 36.

In a second alternative embodiment, as typified by FIG. 3, the warning indicia 38 and 40 are permanently affixed to at least one face of at least one panel portion other than that in which pocket 22 is disposed. For a maximum number of warning messages in such an embodiment, it is desirable to utilize both faces of each such panel portion. Hence it is possible to display, for example, on two faces of one panel portion the messages "HELP" and "PASS RIGHT" and the messages "CAUTION" and "PASS LEFT" on the two faces of the other panel portion. In such an embodiment the plastic material will be opaque (and in fact the two faces of the sheet can be of different colors such as red and yellow). The various indicia can be applied by conventional methods, as for example silk-screening or tape, and can be reflective.

There also will be provided means operable, upon folding the outermost panel portions 42 and 44 of the sheet towards one another upon their respectively continuous fold lines 18 and 20, to retain the sheet in a configuration in which each of the panels defines a side of a hollow prismoid. In the case of two fold lines, and thus three panels, the ends of the prismoid will define a triangle, which will be an equilateral triangle if each panel is of equal width. Although a variety of devices can be used for retaining the sheet in its prismoid configuration, as for example clips, a cord and eyelets, interlocking cutouts, and the like, the preferable sheet retaining means are a two component separable fastening device comprising a plurality of eyes 46 on one component 48 and a plurality of hooks 50, interlocking with eyes 46, on the other component 52. These components, of which VELCRO ® is typical, will be disposed on the parallel edges of the sheet.

When assembled in a prismold fashion such as that described above, any one of the desired warning indicia may be selected for viewing. The indicia so selected will be disposed transverse to the plane of that panel portion carrying ballast pocket 22. With a suitable ballast placed in the pocket, the entire device can be placed on a prominent place on the vehicle, with the warning indicia displayed for other vehicles, where it will remain until removed.

As can be seen from FIG. 4, folds 18 and 20 are such that either panel portion can be folded in the opposite direction, the device thereby assuming a "Z" configuration adapted for storage when not in use. For storage, the ballast introduced into pocket 22, of course, first is removed.

As noted, the sheet preferably is a laminate of plastic material. Stiffening material can be disposed between these laminates in each of said outer panel portions. Such stiffening material can be constituted in the first embodiment described herein by the cards carrying the warning indicia. In the embodiment in which the indicia are permanently affixed to the panel portions, the stiffening can be sandwiched between the plastic laminate.

The preferred embodiment of the present invention constitutes a foldable traffic display comprising a single, substantially rectangular sheet of two laminates of plastic. Each sheet will have defined thereon a pair of fold lines which are parallel to and substantially equidistant from two parallel edges of the sheet so as to divide it into a central panel portion and two outer panel portions. A pocket operable to receive ballast material is defined between the laminates in the central panel portion. Stiffening material is disposed between the laminates in each of the outer panel portions and warning indicia are affixed to each face of each of the outer panel portions. Components of a separable fastening device are affixed to the paralled edges of the sheet and operable to retain the sheet in a configuration in which each of the panel portions defines a side of a hollow prismoid having triangular ends.

Figure 6:
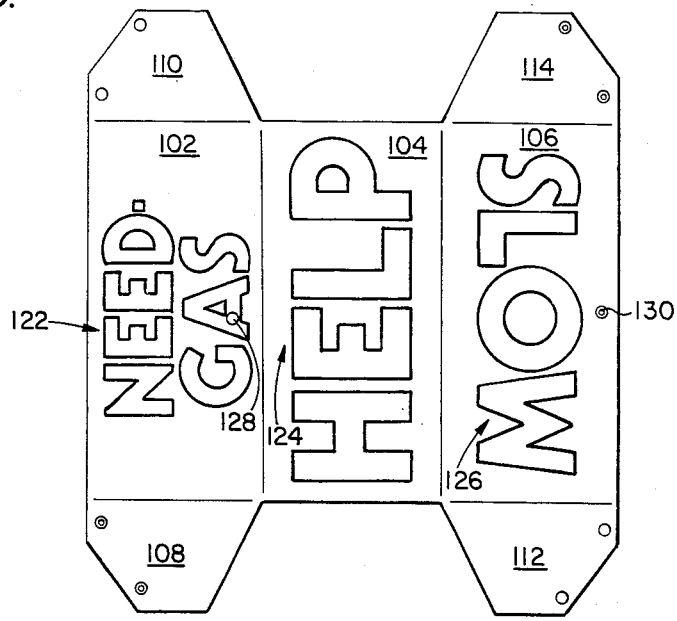
FIG. 6 illustrate the reverse, second side of the embodiment illustrated in FIG. 5.
Figure 7:
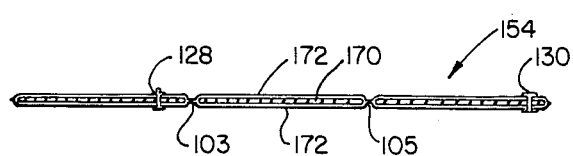
FIG. 7 is a cross-sectional view of the embodiment of FIG. 5 taken along line 7—7.
Figure 8:
FIG. 8 illustrates the alternative embodiment of FIG. 5 in the folded, storable state.
Figure 9A:
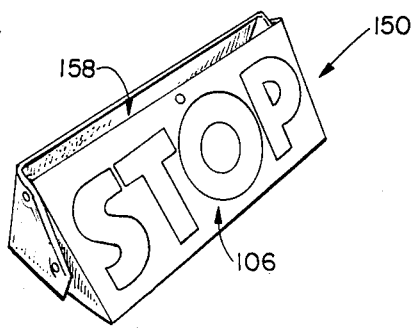
FIG. 9A illustrates the alternative embodiment of the display of FIG. 5 in the erected triangular mode.
Figure 9B:
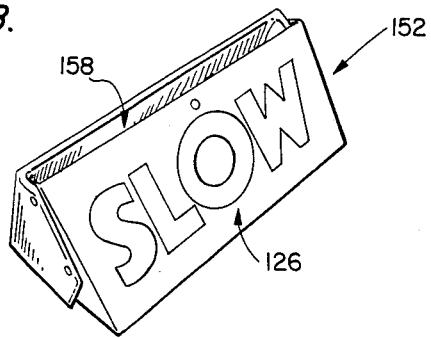
FIG. 9B illustrates the erected triangular mode as in FIG. 9A except with the triangular turned inside-out and the panels reversed.
Figure 10A:
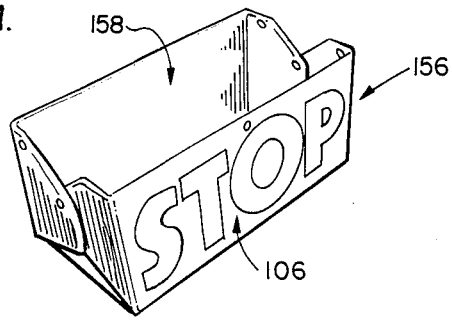
FIG. 10A illustrates the alternative embodiment of the display of FIG. 5 in the erected box mode.

A third alternative embodiment 100 of the invention is illustrated in FIGS. 5 through 10A. FIG. 5 is a plan view of the alternative embodiment 100 in the unfolded state. The alternative embodiment 100 includes a first panel 102, a second central panel 104 and a third panel 106. Panels 102 and 104 are connected together by folding hinge line 103. Similarily, panels 104 and 106 are connected together by folding hinge line 105. A first tab 108 and a second tab 110 are connected to opposite ends of first panel 102 by folding hinge lines 109 and 111, respectively. Similarly, a third tab 112 and a fourth tab 114 are connected to opposite ends of the third panel 106 by folding hinge lines 113 and 115, respectively. A pair of female snap fasteners 132 and 134 are embedded in tab 108. Female snap fasteners 132 and 134 are aligned to mate with male snap fasteners 140 and 142 on tab 112. Specifically, fasteners 132 and 140 mate when the device assumes the shape of a box as shown in FIGS. 10A and 10B. Fasteners 134 and 142 are connected together to form a triangle as shown in FIGS. 9A and 9B. Likewise, male snap fasteners 136 and 138 on tab 110 are aligned to mate with female snap fasteners 144 and 146 on tab 114, respectively, to form the other end of the triangle 150 or box 156. Each tab 108, 110, 112 and 114 has four exterior edges 162, 164, 166 and 168. First edge 162 slopes away from the nearest panel folding hinge line 103 or 105. Edge 162 has a slope to it so that it will not interfere with central panel 104 when the display assumes the shape of a triangle 150 as shown in FIGS. 9A and 9B. Similarly, edge 166 slopes toward the fold lines 103 and 105. The effect of sloping edges 162 and 166 is to taper the tab thereby saving expensive vinyl plastic and reducing the risk of physical interference with other parts of the apparatus. Edge 164 is located between edges 162 and 166 and is parallel to tab fold lines 109, 111, 113 and 115. Remaining edge 168 is a continuation of the outside edge of the first and third panels 102 and 106 and is therefore also parallel to fold lines 103 and 105. Each panel 102, 104 and 106 has a corresponding warning indicia 116, 118 and 120, respectively. The indicia 116 for panel 102 is "CALL POLICE"; the indicia 118 for panel 104 is "MED-ALERT"; and, the indicia 120 for panel 106 is "STOP". Lastly, panel 102 also carries embedded in it a male snap fastener 128 that is aligned to mate with the famale snap fastener 130 embeded in panel 106. The purpose of fasteners 128 and 130 is to secure the display in a folded state 148 as shown in FIG. 8. This is accomplished by folding first panel 102 into central panel 104 and then folding the third panel 106 on top of first panel 102 and then snapping fasteners 128 and 130 together. The alignment of male snap fastener 128 with respect to female snap fastener 130 can be further appreciated from the cross-sectional view of FIG. 7 that shows the display in the flat state 154. Also visible in FIG. 7 is the stiffening material 170 that is sandwiched in between the vinyl plastic sheets 172. The folding hinge lines 103 and 105 are preferrably welds formed between the upper and lower sheets of plastic 172.

FIG. 6 illustrates the reverse side of the third alternative embodiment 100 of FIG. 5 in which the display 100 has been rotated 180 degrees from top to bottom. The reverse view reveals a second set of indicia 122, 124 and 126 associated with the reverse sides of panels 102, 104 and 106, respectively. The indicia associated with panel 102 is "NEED GAS"; the indicia associated with panel 104 is "HELP"; and, the indicia associated with panel 106 is "SLOW".

FIG. 9A shows the display 100 erected in the triangular mode 150 with the warning indicia shown in FIG. 5 facing outward. The word "STOP" is visible in this orientation. However, the triangle can be turned around or upside down so that the other indicia 118 "MED-ALERT" or 120 "STOP" are visible to oncoming traffic. FIG. 9B shows a reversed mode 152 with a triangular display 150 of FIG. 9A turned inside-out. In this mode the warning indicia 122 "NEED GAS", 124 "HELP" and 126 "SLOW" are visible. The reversed triangular mode 152 can also be rotated so that the three other indicia 122, 124 and 126 are made selectively visible to oncoming traffic. In both triangular modes 150 and 152 a pocket 158 is formed in the hollow interior of the three dimensional display. Panels 102, 104 and 106 form the sides of the pocket 158 while tabs 108, 110 and 112 and 114 define the two ends thereof. The pockets 158 is accessible from outside of the display and is adapted to receive ballast material such as rocks or trunk tools to keep the display from being blown away.

Figure 10B:
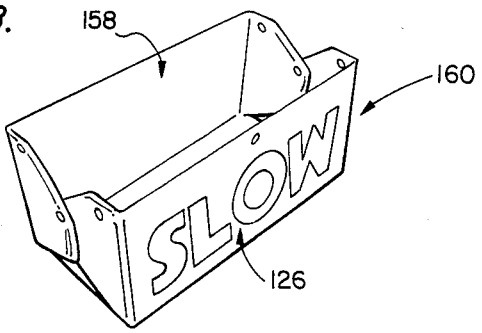
FIG. 10B illustrates the erected box mode as in FIG. 10A except with the box turned inside-out and the panels reversed.

FIG. 10A shows the display 100 in he erected box mode 156. The warning indicia 116, 118 and 120 of FIG. 5 are visible and may be selectively oriented to face oncoming traffic. A ballast receiving pocket 158 is also formed and serves the same purpose that it does in the triangular modes 152 and 156. FIG. 10B shows the box mode 160 with the panels reversed and the box of FIG. 10A turned inside-out. In the reversed mode 160 the warning indicia 122, 124 and 126 of FIG. 6 can be made selectively visible to oncoming traffic.

The alternative embodiment has several advantages over prior art display devices. First, it can be erected in either the triangular or box mode. The triangular mode is best suited when the display is placed on the ground facing upward towards oncoming traffic. When it is not possible to place the display on the ground it can be put on an elevated location such as the roof of a car. On the roof of a car it is desirable to erect the display in the box mode since that makes the panels more parallel to and therefore visible by passing vehicles. Second, the present invention is very easy to store. It can be folded flat and locked in the folded mode 148 for long periods of time. The material is lightweight and easy to manipulate. Third, in both the triangular mode 150 and the box mode 156 the display forms a ballast receiving pocket 158 which can accept any kind of weight. Ballast can be very important under conditions of high winds or heavy traffic. Fourth, the display is capable of selectively presenting six different warning indicia to passing motorists. Fifth, the vinyl plastic material used is relatively inexpensive, easy to store and tough. Sixth, and lastly, the preferred vinyl is white with the indicia in bright, visible day-glo lettering which is printed thereon. The warnings are visible from a very far distance and effective in preventing accidents that otherwise might occur.

While the invention has been described with reference to the preferred embodiment thereof it will be appreciated by those of ordinary skill in the art that various changes may be made to the structure and materials of the invention without departing from its spirit and scope.

We claim:

1. A traffic display apparatus comprising:
   a first rectangular panel;
   a second rectangular panel foldably attached to said first panel along a first fold line;
   a third rectangular panel foldably attached to said second panel along a second fold line;
   fastening means attached to said first and third panels for selectively fastening said first and third panels to each other, said fastening means including a first and a second tab foldably attached to opposite ends of said first panel and a third and fourth tab foldably attached to opposite ends of said third panel; and,
   locking means incorporated in said tabs for selectively attaching said tabs to each other,
   wherein the fastening of said fastening means causes the display apparatus to assume a three dimensional shape.

2. The apparatus of claim 1 wherein said locking means comprise male and female snap fasteners.

3. The apparatus of claim 2 wherein said locking means includes a first and second pair of snap fasteners attached to said tabs and located thereon in such a fashion as to form a triangular, three dimensional shape from said panels and tabs when said first and second pair of snap fasteners are fastened to each other.

4. The apparatus of claim 3 wherein said locking means includes a third and a fourth pair of snap fasteners attached to said tabs and located thereon in such a fashion as to form a box-like, three dimensional shape from said panels and tabs when said third and fourth snap fasteners are fastened to each other.

5. The apparatus of claim 4 wherein said tabs include a first edge that slopes away from the nearest adjacent fold line.

6. The apparatus of claim 5 wherein said tabs include a second edge that slopes toward the nearest adjacent fold line,
   wherein said tabs are tapered so that said first edge does not interfere with said second panel and said second edge does not interfere with said first and third panels when said apparatus is erected to form a three dimensional, triangular display.

7. The apparatus of claim 6 wherein said fastening means include a pair of female snap fasteners on said first and fourth tabs and a pair of male fasteners on said second and third tabs aligned to selectively mate with the female snap fasteners on said first and fourth tabs.

8. The apparatus of claim 7 further comprising:
   a folded state locking means to lock and display apparatus in the collapsed state when said first and third panels are folded in upon one another.

9. The apparatus of claim 8 wherein said folded state locking means comprises a male and female snap fastener carried by said first and third panels and aligned to mate with one another when said first and third panels are folded in upon one another.

* * * * *